INVENTOR
KARL S. VAN DYKE
BY [signature] [signature]
ATTORNEYS

INVENTOR
KARL S. VAN DYKE
BY
[signature]
George Sipkin
ATTORNEYS

INVENTOR
KARL S. VAN DYKE
BY *[signatures]*
ATTORNEYS

INVENTOR
KARL S. VAN DYKE
BY [signature] George Lipkin
ATTORNEYS

INVENTOR
KARL S. VAN DYKE
BY [signatures]
ATTORNEYS

Jan. 9, 1962 K. S. VAN DYKE 3,016,513

FM ECHO-RANGING SYSTEM

Filed May 26, 1943 6 Sheets-Sheet 6

INVENTOR

KARL S. VAN DYKE

BY [signatures]

ATTORNEYS

United States Patent Office 3,016,513

Patented Jan. 9, 1962

3,016,513
FM ECHO-RANGING SYSTEM

Karl S. Van Dyke, Arlington, Va., assignor to the United States of America as represented by the Secretary of the Navy Filed May 26, 1943, Ser. No. 488,501
3 Claims. (Cl. 340—3)
(Granted under Title 35, U.S. Code (1952), sec. 266)

This invention relates to a method and device for determining the range, bearing, nature and extent of a distant or unseen object.

The invention is particularly useful when such an object is a submarine, airplane, vessel, wreck, mine, fish, bottom irregularity, etc., and thus has applications in naval, navigational, detection, survey, salvage, commercial fishing, aircraft and other similar fields.

One of the objects of the invention is a method and device capable of focusing its attention on one particular volume element of the transmitting medium, and at the same time, ignoring all others.

Another of the objects of the invention is a method and device for presenting essentially continuous information to the operator about any objects within the particular volume element upon which attention is focused.

A further object of the invention is an echo-ranging system capable of providing information in a manner such that differentiation may easily be made between echoes received from different objects.

A still further object of the invention is an echo-ranging system providing a wave, frequency modulated in sawtooth fashion.

An even further object of the invention is an echo-ranging system providing a wave, frequency modulated in sawtooth fashion, in which the sawtooth frequency may be varied to produce a predetermined beat frequency when the transmitted wave is heterodyned against the received echo.

Still another object of the invention is an echo-ranging system providing a wave, frequency modulated in sawtooth fashion, in which the sawtooth frequency, as it is varied, gives a direct range reading.

And another object of the invention is a device and method for fire control in which the errors in range caused by relative motion between the firing point and the target are compensated for automatically.

Although the present invention is not limited to submarine echo ranging, one of its principal advantages is its simple application for this purpose. Conventional submarine sound ranging systems are usually responsive to noise, reverberation and echoes from a large volume of water, with the result that the operator must exhibit a high degree of skill in order to perceive, identify and determine range and bearing coordinates of a desired object in the presence of all the possible sources of interference.

Additionally, conventional submarine sound ranging systems usually present a series of short duration echoes separated by long periods of lost time. These short echoes do not allow an operator to detect differences in quality and character which are necessary in order to determine something about the nature of the object producing the echo. The present invention allows wakes, schools of small fish and other sources of extraneous echoes to be easily differentiated from echoes obtained from the hulls of surface and submarine vessels and mines, by providing an essentially continuous echo signal to the operator. The essentially continuous nature of the echo signal in the present invention materially increases the total amount of information per unit of time that is presented to the operator.

In detecting and attacking a hostile submarine it is essential that the attacking vessel obtain rapid information as to changes in range and bearing of the hostile submarine. The essentially continuous echo signals obtained with the present invention lend themselves to various automatic control applications, such as automatic training of hydrophones, guns, depth charge projectors, etc.; automatic range keepers to adjust the angle of elevation of guns or other ordnance weapons; automatic steering of the attacking vessel toward the hostile submarine; and automatic transmission of information to a computing and predicting fire director mechanism.

In general, the invention is an echo-ranging system capable of transmitting a continuous signal, frequency modulated with a recurring linear sawtooth wave. Means are provided for receiving the reflected or echo wave when such transmitted signal is reflected from an object, and heterodyning such reflected wave with the transmitted signal. Because the velocity of the wave in any medium remains essentially constant, the time intervening between transmission and reception is directly proportional to the range of the reflecting object. It is obvious that the transmitted and reflected wave will have the same time-frequency pattern, although a time-phase displacement corresponding to the round-trip transit time will be present. If then, the sawtooth rate is varied until this phase displacement is equal to one-half the sawtooth period, it is seen that a continuous, constant frequency, heterodyne signal will be produced. The sawtooth rate is arranged to be manually changed, and this adjustment is thus made the main control of the system, calibrated to read range directly.

The above description is intended to describe the broad invention with respect to all types and kinds of waves. Although the greater portion of the specific description will be related to such a system as applied to high frequency sound for underwater purposes, it is to be clearly understood that the broader invention is claimed. Values given will be illustrative only, and in most instances, applicable only to sound-ranging systems.

Figure 1:
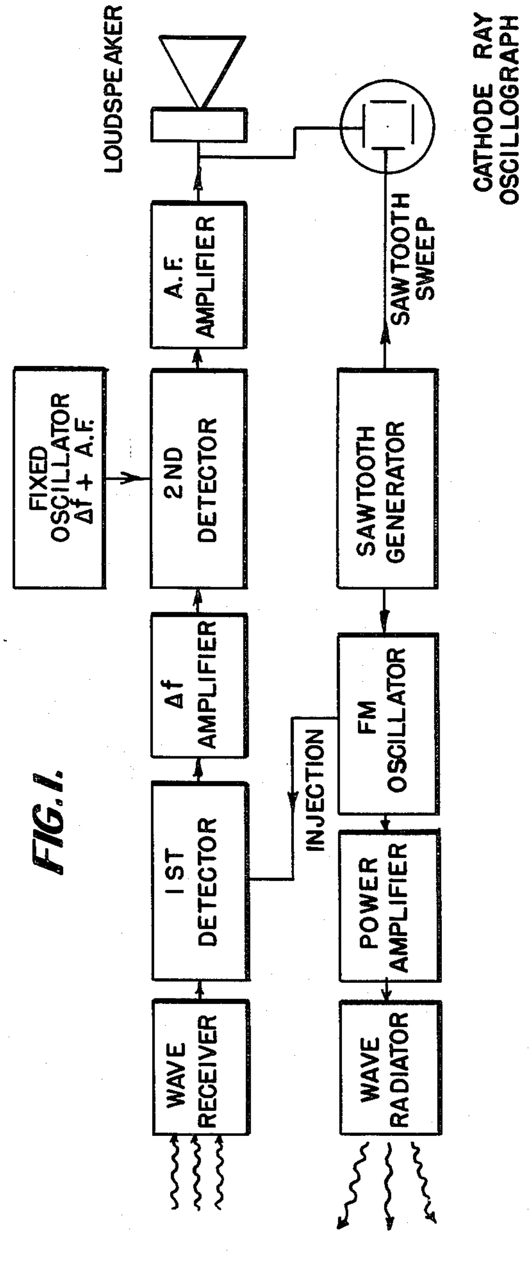
FIG. 1 is a schematic block diagram of the system.

In FIG. 1, a block diagram illustrating the various elements of the system is shown. A sawtooth generator is provided to generate a relatively low-frequency linear sawtooth wave. The resulting wave provides a linear time base for a cathode-ray oscillograph; and is also used to modulate the frequency of the oscillator. The output of this FM oscillator branches into two circuits, one providing heterodyne injection to the first detector and the other branch, after amplification in the power amplifier, feeding the wave radiator. Echoes from a distant object are picked up by the wave receiver and applied to the first detector, where they are heterodyned with the FM oscillator output to produce a difference frequency which is selected and amplified by the $\Delta f$ amplifier. The output of this element is applied to the second detector, where it is heterodyned with the output of the fixed oscillator down to an audio frequency. The audio frequency is then applied to the A.F. amplifier whose output branches feed the loudspeaker and the deflection elements of the cathode-ray oscillograph.

For purposes of illustration, the elements of the system shown in FIG. 1 may be thought of as elements operable in an underwater sound system. The wave radiator and wave receiver thus become underwater transducers. The FM oscillator will be arranged to operate at some frequency in the supersonic range, for instance, $42\pm6$ kc., and it, together with the associated sawtooth generator, will be subsequently described in detail (see FIG. 2). The power amplifier and cathode-ray oscillograph may be those well known in the art and the same is true of the first detector wherein the heterodyning takes place. The $\Delta f$amplifier is one tuned to relatively lower frequencies, which in the above illustrated case, would not exceed 12 kc., the maximum possible difference frequency. The second detector and fixed oscillator are also well known and provide an audio frequency in the 800-cycle range in the illustrative case. The A.F. amplifier and loudspeaker are conventional, arranged to handle the A.F. signal.

Since the accuracy of the system is directly dependent upon the linearity of the sawtooth wave, the combination composed of the FM oscillator and the sawtooth generator will be described in detail. This combination, illustrated in FIG. 2, will be referred to as the sawtooth-modulated oscillator.

Figure 2:
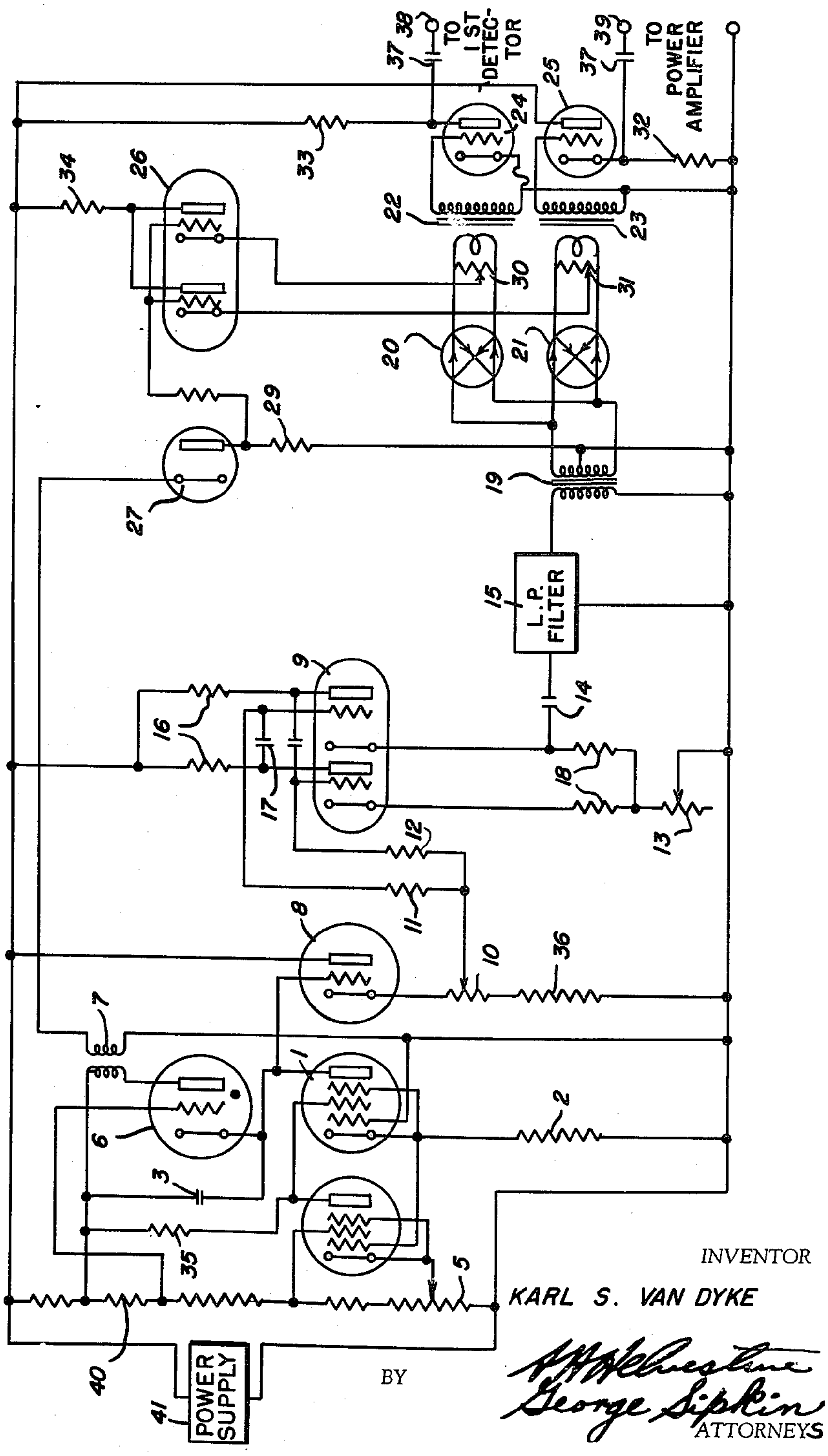
FIG. 2 is a schematic diagram of the sawtooth-modulated oscillator, combining the FM oscillator and the sawtooth generator.

A sawtooth generator generally consists of a condenser, a resistor, and a discharge tube. Current is fed through the resistor into the condenser and the voltage across the condenser increases until it reaches the firing potential of the discharge tube, at which time the latter ionizes and discharges the condenser. The cycle then repeats, producing a repetitive wave which gradually and linearly increases with time up to the discharge or "flyback" point, at which time a discontinuity occurs which brings the voltage wave instantaneously to zero. To maintain the linearity of the wave thus generated, the current flowing into the condenser must be constant with time. Normally the current under these conditions would vary exponentially with time and therefore a constant current pentode tube, rather than a resistor, is used in the charging circuit in the present invention. Such a tube is characterized by the fact that its A.-C. or variational plate resistance is many times greater than its D.-C. plate resistance. In FIG. 2 the constant current tube 1 serves as such a resistor in the charging circuit. It is provided with a bias resistor 2 and is arranged to charge condenser 3 from an external power supply. Any cyclic variation in potential across resistor 2, indicating inconstancy of current, is applied to the control grid of tube 4, giving true constant current feedback. Tube 4, in turn, controls the screen voltage of tube 1, the amount of control being a function of the amplification factor of tube 4. The current through tube 1 must be constant for any given sawtooth frequency, but to change the period of the sawtooth, this current must be manually adjusted, and over a rather wide range. The adjustment is accomplished by changing the cathode voltage of tube 4 by means of the potentiometer 5, which is the "range control."

When the voltage across condenser 3 reaches a predetermined point, tube 6 ionizes and discharges the condenser through the primary of transformer 7, the reactance of which limits the discharge current to a safe value for tube 6. The voltage induced in the secondary of transformer 7 is used for an operation to be described later.

The sawtooth voltage appearing on the plate of tube 1 is coupled directly to the grid of tube 8. This must be a direct connection because the sawtooth rate can be as low as ⅛ per second, for a range of 3000 yards, and only a D.-C. amplifier will amplify such low frequencies without distortion. Tube 8, commonly referred to as a "cathode follower," couples the sawtooth voltage to the grid of the frequency-modulated oscillator 9, through potentiometer 10 and resistors 11, 12. Tube 9 generates a frequency that is a linear function of applied grid voltage. Potentiometers 10, 13 control the amplitude and the average value respectively of the sawtooth voltage applied to tube 9, and are used for adjusting the frequency generated by the oscillator. The output of tube 9, which is rich in harmonics, is coupled through a blocking condenser 14 to a low-pass filter 15 to improve the wave form. Resistors 16 serve as plate resistors for tube 9, resistors 11, 12 and condensers 17 constitute the conventional frequency determining circuit for the same tube, and resistors 18 serve as conventional cathode resistors for the same tube. Transformer 19 couples the output of low-pass filter to two varistors 20, 21.

Transformer 22 and transformer 23, in turn, couple the varistors to output tube 24 and output tube 25, respectively, which, in turn, furnish signal voltage to the power amplifier and injection voltage to the first detector. The function of the varistors is to cut off the signal during the time of discharge of condenser 3, because the accompanying very rapid change in the generated frequency makes an undesirable noise in the receiver. Tube 26 is provided to supply bias voltage to maintain the two varistors in the operative condition (that is, while the signal is being transmitted). At the time of the discharge of condenser 3 through tube 6, the current flow in the primary of transformer 7 induces a pulse voltage in the secondary which is rectified in the proper polarity by tube 27. The negative voltage thus obtained is applied to the grid of tube 26 through resistor 28, cutting off the plate current and preventing the transmission of the signal through the two varistors 20, 21. This operation reduces the noise caused by the "flyback," or discharge of condenser 3, and is called "blanking." Resistor 29 provides a return path for the enabling bias applied to varistors 20, 21, by tube 26, which appears as a square wave pulse of direct current and is balanced out of the output circuit by means of balancing potentiometers 30, 31. Resistors 32, 33, 34, 35, 36 are conventional coupling resistors for establishing desired potentials.

The outputs of tube 24 and tube 25 are supplied, through blocking condensers 37, to the first detector and the power amplifier at terminals 38, 39 respectively.

Polarizing potentials for the various elements of the sawtooth-modulated oscillator are supplied through voltage divider 40 from a voltage regulated power supply 41 of low internal resistance. Because this power supply may be of a conventional type, it is shown in FIG. 2 as a simple block diagram.

Figure 3:
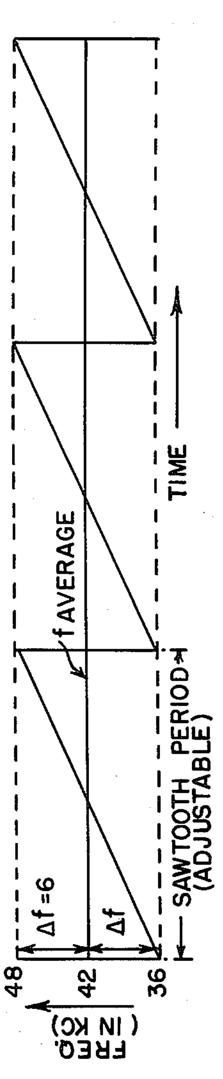
FIG. 3 is a frequency-time plot of an upward or positive sawtooth wave.
Figure 4:
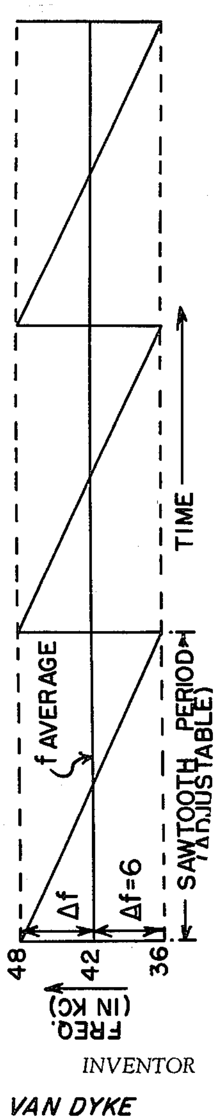
FIG. 4 is a frequency-time plot of a downward or negative sawtooth wave.

The signal produced by the sawtooth-modulated oscillator may take two forms and may be used in several ways. Plots of the two forms are illustrated in FIGS. 3 and 4, in which time is plotted as abscissa and frequency as ordinate. The slope of the modulation sawtooth is taken to mean the lesser of the two slopes which constitute any linear sawtooth wave. The greater slope is usually termed the retrace or "flyback" slope. When the sawtooth slope is upward (corresponding to a steady increase in carrier frequency with time), as shown in FIG.

3, the sign of the slope is taken to be positive; and conversely when it is downward, as shown in FIG. 4, it is taken to be negative. The oscillator of FIG. 2 produces the type of wave shown in FIG. 4, but this same oscillator can be made to produce the wave shown in FIG. 3 simply by introducing a conventional D.-C. amplifier stage between the cathode of tube 6 and the grid of tube 8, which serves to reverse the polarity of the sawtooth.

As has been stated, the actual values of the frequency can be varied as is desirable; but the limits between which the frequency is varied in any one system remain fixed, although the rate at which the sawteeth are repeated is controllable manually. Thus, if the "range control" 5 is left unchanged through a cycle, the frequency change per second remains a constant throughout that cycle. The plot of the frequency against time is then a straight line, and the modulation is "linear sawtooth" in form. As has been explained, the abrupt return to the initial frequency is termed "flyback," and it has proved convenient to turn off or "blank" the transmitter during this period by means of the varistors 20, 21. If this is not done, there is likely to be a considerable and annoying disturbance in the receiver at every "flyback."

It is important to note two figures concerning any given system; namely, the average frequency, $f_{av}$, at which it operates, and the maximum frequency deviation which it employs, $\pm\Delta f$. For instance in the chosen illustrative case, we use a 42±6 kc. channel, although other combinations might be used. The two parameters, and their ratio $f_{av}/\Delta f$, determine several important quantities in operation. Among other things, as will be shown, the ratio $f_{av}/\Delta f$ determines the amount of the error in range which the Doppler effect produces and the sign of the Doppler error is dependent upon whether the sawtooth is positive or negative.

In operation, the frequency-modulated signal radiated into the water by the transducer may encounter objects that will return echoes to the receiver. These echoes will be delayed by a time interval which is uniquely determined by the velocity of sound in the medium and the distances of the objects. The echo time intervals are, of course, independent of the particular rate of sawtooth repetition. Thus, the time displacement between the transmitted and the reflected signal is likewise independent of the rate of sawtooth repetition. To illustrate this, three echoes are plotted in FIG. 5: No. 1, from an object at short range; No. 2, from a more distant object whose echo returns after a time delay of such amount that its flyback occurs exactly half-way through the transmitted sawtooth cycle; and No. 3, from an object at a still greater range than this. The echoes are, of course, when plotted, merely frequency sawteeth displaced along the time axis by an amount proportional to their range. The sawtooth rate is under the operator's control and it can be changed so as to make any one echo fall at the half-way point. The half-way point is of fundamental importance and an echo that has been brought to this position in the cycle by the appropriate change in sawtooth rate is said to be "focused"; thus, in FIG. 5, echo No. 2 is focused but Nos. 1 and 3 are not. In practice this fact means that object No. 2 is "heard," and Nos. 1 and 3 are not. In operation, the operator will "search" the water by means of the range control 5, and if a target is present at any particular range, the constant tone will be heard in the loudspeaker, as the sawtooth frequency passes through the particular frequency corresponding to that range.

Figure 5:
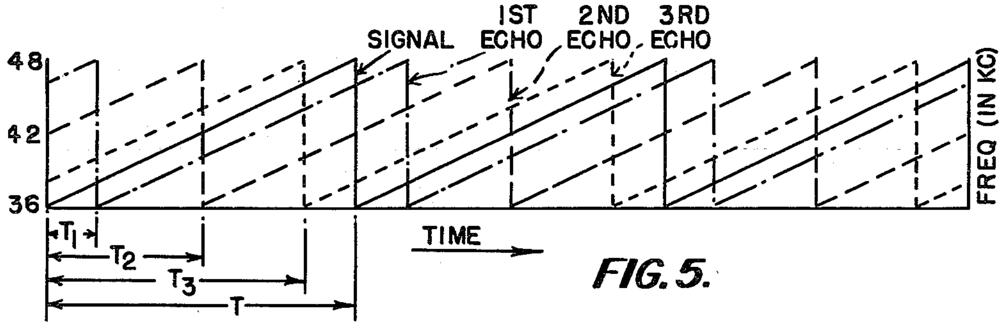
FIG. 5 is a frequency-time plot of three reflected waves superimposed on the wave shown in FIG. 3.
Figure 6:
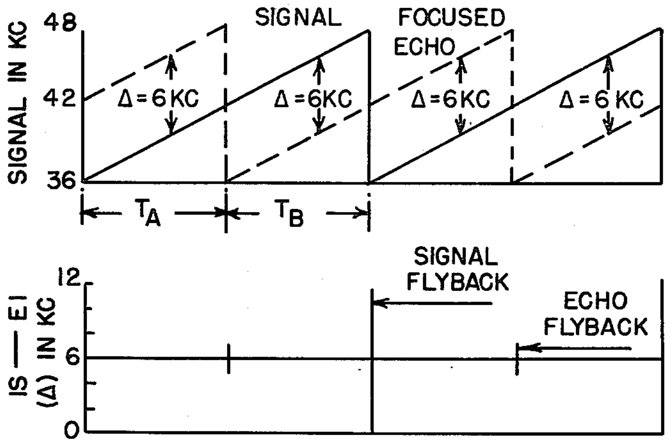
FIGS. 6, 7 and 8 show separate plots of a reflected wave as compared with transmitted waves at three different sawtooth rates, together with plots of the respective difference frequencies.
Figure 7:
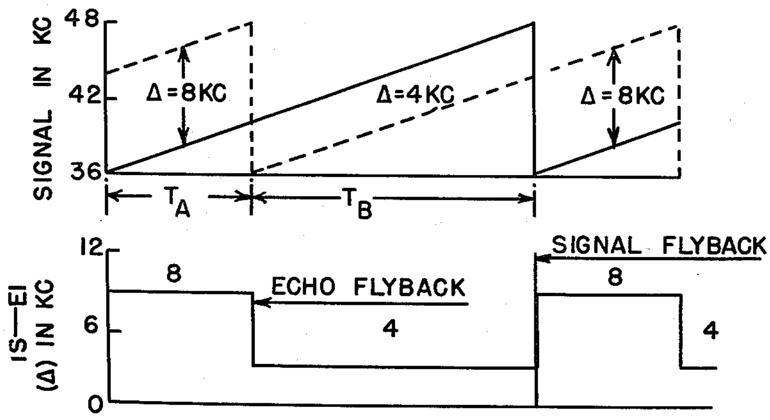
Figure 8:
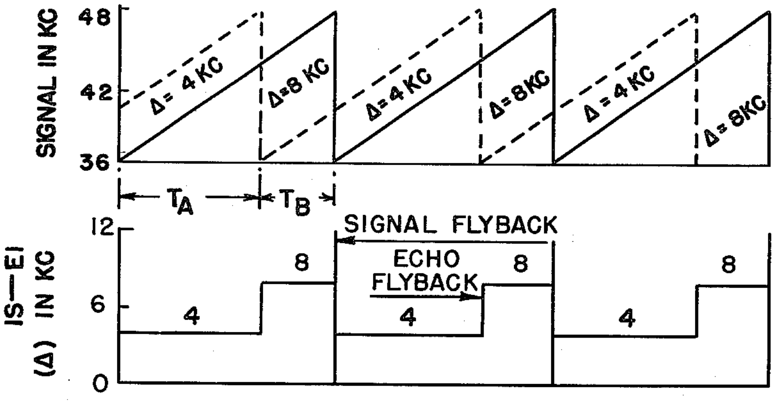

FIGURE 5 shows three echoes at one sawtooth rate. FIGURES 6, 7 and 8 show the converse of this: The echo from the same object, but at three different sawtooth rates. In FIG. 6 the echo is "focused," in FIG. 7 the rate is too slow by 50%, and in FIG. 8, too fast by 33%. Plotted as Δ on the same figures are the values of the difference frequency which are the differences between the instantaneous frequency of the signal that is being transmitted (S) and of the echo (E) that is returning at the same instant. Since the sawteeth are "linear," the differences are, in general, pairs of tones of constant frequency, alternately and symmetrically higher and lower than 6 kc. In the special case of the "focused" echo, the two difference tones coincide in frequency, and are both equal to $\Delta f$, which is just equal to the frequency deviation of the transmitted signal, in the illustrative case, 6 kc.

Immediately following the "flyback" of the transmitted positive sawtooth signal, and for the first part of the cycle, the echo returning from the previous cycle lies above the transmitted signal in frequency. In the second half of the cycle following echo "flyback," the echo has returned to the start of the sawtooth and now lies below the outgoing signal ("above" and "below" are interchanged if a negative sawtooth is used). The two differences are, in the radio engineering sense, "images" of the other, and when the transmitted signal is adjusted to focus on the echo, the images coincide. In FIG. 7 the sawtooth is slower by 50% than the focused rate but the echo returns from the same target as in FIG. 6. The difference frequencies are no longer 6 kc., but 4 kc. through that part of the cycle immediately preceding signal flyback of the outgoing signal, and 8 kc. in that part of the cycle immediately following flyback. FIG. 8 shows the opposite case: The sawtooth period has been decreased by 33% but with an echo still from the same target as in FIGS. 6 and 7. There exists an 8 kc. and 4 kc. difference frequency, but the phase in the sawtooth cycle at which they occur has shifted, as shown. There are thus two ranges which produce the same pair of differences unless the echo is properly "focused." For this reason, to avoid ambiguities, the system is so arranged by means of its filters that only when the echo signal is displaced in phase by one-half period is the reflecting object actually "seen" or "focused."

When the transmitter is in operation, there is an echo returning from every object in the "field of view" of the transducer at all times but the receiver "focuses" on the one echo only. When the signal and the echo frequency are heterodyned in the first detector, the difference tone having the numerical value $\Delta f$ (6 kc.) is selected and amplified. Since the $\Delta f$ amplifier is tuned to select only the 6 kc. difference frequency and this is the only difference tone whose "image" is equal to itself numerically, it is the only one which will be supplied to the second detector because the $\Delta f$ amplifier is provided with a narrow pass-band filter sharply tuned to 6 kc., selectivity in this stage determining the signal to noise ratio, and the "sharpness of focus." The 6 kc. output of the $\Delta f$ amplifier could, of course, be listened to directly on a loudspeaker, but it has proved desirable to provide for heterodyning the 6 kc. against the slightly higher beat frequency of a fixed oscillator as, for instance, 6800 cycles, and listen to the 800-cycle beat note.

The selectivity incorporated in the $\Delta f$ amplifier may easily be made sufficient to reject any echo which does not give a frequency of 6 kc. ±200 cycles with the transmitted signal. As such, the frequency pass-band of the filter arranged with the $\Delta f$ amplifier in the receiver circuit corresponds to a certain depth of focus in the medium. Thus, the echoes from objects lying within a certain distance of the focused range will be heard, and the system may be sensitive only to echoes from the element of volume thus defined.

Referring to FIGS. 6, 7 and 8, if the range setting is not quite in "focus," successive notes of alternately high and low pitch will come from the loudspeaker. As the sawtooth rate is changed slowly toward the focus condition (or as the object moves closer toward the proper range), the two notes will approach each other and become equal in frequency, and if the range change is continued they will "cross over" and separate again, one rising and one falling until they pass beyond the filter limits and vanish. The reason for incorporating a fixed beat frequency oscillator and second detector to lower the final frequency is that, aside from greater comfort to the listener, the total change of pitch as a given target moves through the focus position is much greater. Thus, the pitch change if the difference frequency is listened to directly is only from 6200 to 5800, or a semi-tone; but if the frequency is heterodyned with 6800, the pitch changes from 600 to 1000, or a "sixth," for the same change in range. It has been found convenient in some cases to listen to the system when it is adjusted just off focus, because the noise spectrum, being approximately uniform, sends an 800-cycle disturbance through the filters all the time, whereas the echo can be arranged to give tone alternately above and below this disturbance. Advantage is thus taken of the frequency discrimination of the ear itself, and the procedure is particularly good for signals just at the threshold of perception. The accuracy of range setting may be indicated in the following example: Consider an object in focus at some particular range. The loudspeaker output consists of successive tones of equal pitch, in the example, 800 cycles, and the equality of pitch is an indication of the focus condition. If the range control 5 is now altered enough to give two notes which differ in pitch by an octave, one note must have fallen by the same number of cycles as the other one rose and the new frequencies are 1066 and 533. The 6000-cycle output tones which came from the Δ frequency stage before the change have evidently now become 6266 and 5733 cycles, and lie just at the edge of the filter's pass-band. The amount the range dial must be altered to produce this change is readily calculatable to be 4.4%. Pitch changes of less than 1/10 of an octave between successive notes are, of course, readily detectible and the accuracy of setting on the range dial is therefore greater than .44%. In practice the limit of accuracy has been found to be limited only by the degree of linearity of the sawtooth signal, since a non-linear signal produces a non-constant difference tone. In one experiment the pitch change produced by moving the receiving hydrophone a distance of two yards, while the device was focused on a target 200 yards away, was very noticeable. Since the transducer only was moved, the range change was ½%, and less than that could have been easily detected.

One theoretical objection to the present system has been found not to be serious in practice. This objection has two aspects, the first being that a target is theoretically in focus not merely at one sawtooth rate, but also at odd multiples of that rate, because the echo may lie midway in the next transmitted sawtooth cycle, the next-but-one, etc. However, since the sharpness of "focus" is increased in proportion to the "harmonic" of the base rate in use, this multiplicity causes no difficulty and the fundamental is easily recognized. Secondly and conversely, targets at ranges R, 3R, 5R, etc., will theoretically appear in "focus" together. But because the signal intensity falls so rapidly with distance, this multiple "focus" causes no confusion in practice.

It has been shown that the echo-ranging system described herein focuses on a small volume element of the medium in which the target object is located. Under these conditions, the output signal indication supplied to the operator is essentially continuous. The continuity of this indication enables the operator to accurately determine range and bearing of the target object. Additionally it has advantage in determining the nature and extent of the target object.

The system as described so far, however, necessitates a certain delay after any readjustment of the sawtooth rate in that the operator must wait for the echo to return from the target before a clear indication is again given. This disadvantage may, however, be overcome if scanning is performed not in the transmitter but in the receiver itself. It will be noticed that every target present in the radiation beam is returning echoes all the time and the output of the first detector of the receiver chassis contains frequencies corresponding to each target.

The ideal device would be one which analyzed this spectrum continuously and completely. Certain approximations of this ideal have been found useful and include (1) means for automatic range scanning, (2) means for automatic angular scanning.

Figure 9:
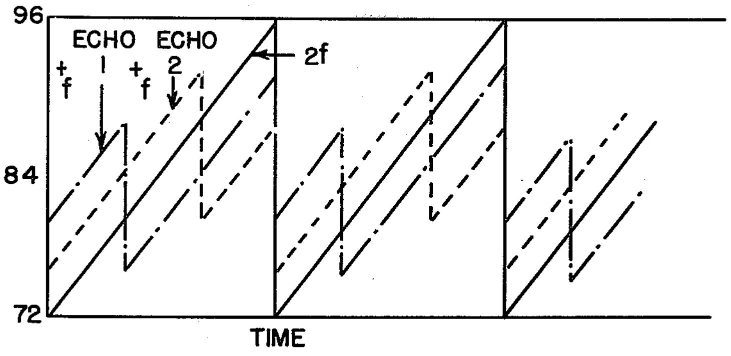
FIG. 9 shows a frequency-time plot of the sum-components out of the first detector of one form of the invention in which the dotted lines represent the sum beats between the transmitted wave and two separate echoes, and the solid line represents the second harmonic of the transmitted wave.

Three methods for providing automatic range scanning are worthy of consideration. The first of these depends upon utilizing the sum of the signal frequency and instantaneous transmitted, or injection, frequency as it emerges from the first detector. This sum frequency, see FIG. 9, from any target passes twice per sawtooth cycle through a frequency equal to twice $f_{av}$. Here the two dotted lines represent two echo frequencies to each of which has been added the injection frequency. If a filter tuned to this frequency ($2f_{av}$) be placed in the output of the first detector there will be a pulse in its output twice per sawtooth. All targets at all ranges produce such pulses and although there is no more focusing property in this type of operation than in normal pulse reception, there are other advantages. One of these advantages is that the frequency being used to detect a target is different in the two crossings of twice $f_{av}$. It is evident that this operation scans in range twice per cycle out to the limit of the echo reception. Several variant forms of circuit to utilize this method of operation will be obvious to those skilled in the art.

Figure 10:
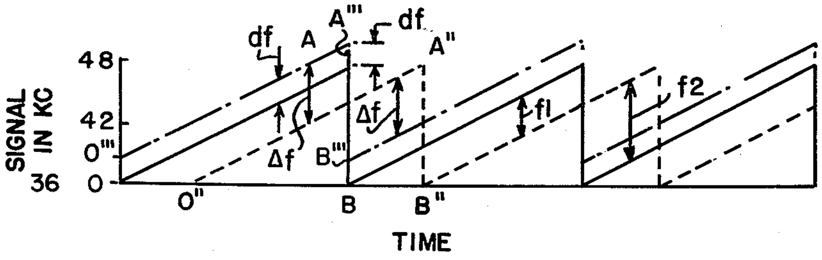
FIG. 10 is a frequency-time plot of the frequencies applied to the first detector from the wave receiver and the sawtooth-modulated oscillator in certain forms of the invention.

Another method which retains the advantages of sharp focusing and which yet will scan in range at any rate desired, either manually or automatically, is called displaced injection. In this method the frequency fed to the first detector of the receiver is not the same as the frequency fed into the water, but differs from it by a definite and controllable amount. In other words, the injection frequency is a linear sawtooth displaced either up or down by an amount $df$, which is in practice never greater than $\Delta f$. This is accomplished by inserting a heterodyne detector in the injection branch of FIG. 1 which couples the FM oscillator to the first detector. An oscillator, adjustable manually from 42 to 48 kc. is applied to this heterodyne detector in order to provide the injection displacement in frequency. In FIG. 6, a "focused" echo was illustrated, in which case the period of each sawtooth was made equal to twice the round-trip echo time. In this customary method of operation, this echo is then heterodyned with the transmitted signal to give a beat frequency $\Delta f$, which is the same both before and after the "flyback." In FIG. 10, OAB represents the frequency-time plot of the outgoing signal and O''A''B'' similarly portrays the echo from another target at shorter range. The difference frequency between this echo and the signal is of frequency $f_1$ before the signal "flyback" and $f_2$ after the signal "flyback." Neither $f_1$ nor $f_2$ will pass the filters in the $\Delta f$ amplifier, set at $\Delta f$. It is seen that by shifting the frequency of the injected signal to O'''A'''B''' it is possible to obtain a beat note of $\Delta f$, thus "focusing" on the echo. The displaced injected frequency may be changed as rapidly as necessary, because it is produced entirely in the receiver, and the range may thus be scanned at any rate desired, because it is not necessary to wait the round-trip echo time to perceive the effect. To determine the actual range of the target, let R be the normal range corresponding to the sawtooth rate used, and let $r$ be the actual range of target, then $$r/R = df/\Delta f$$

and $$r = R\,df/\Delta f$$

in which $df$ is the frequency displacement and $\Delta f$ is the average frequency deviation, and also the $\Delta f$ filter setting. Two methods of achieving this displacement between signal and injected frequency have been used, though several others are possible. In the first one, the input signal frequency is added to a fixed frequency by modulation and this sum frequency is then heterodyned with a second oscillator whose frequency is adjustable. It will be seen that the resulting difference frequency has been changed from the input signal frequency by the difference between the fixed and adjustable oscillators.

Figure 11:
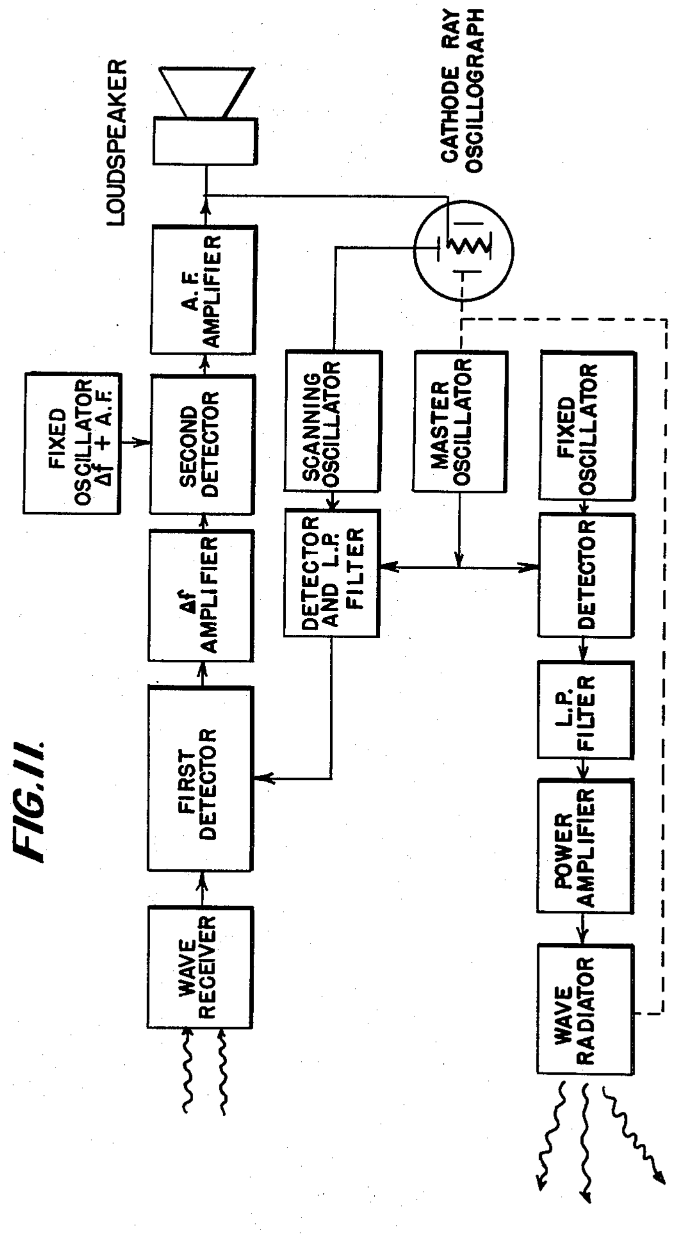
FIG. 11 is a schematic block diagram of one method of operation of the invention.

Another method of achieving the same result is illustrated in FIG. 11. This method provides for a sawtooth-modulated oscillator, which consists of the FM oscillator and a sawtooth generator shown in FIG. 1. This is designated as the master oscillator and sweeps a certain range, for example, 126±6 kc. Its output is heterodyned with that of a fixed oscillator, operating in the illustrated case at 168 kc., in a detector and the 42±6 kc. component is passed to the power amplifier and wave projector, through a 60 kc. low-pass filter.

For injection, the same 126±6 kc. signal is heterodyned in a detector with another oscillator—the scanning oscillator—whose frequency is adjustable in this case in the range 168±6 kc. The difference frequency between these two may obviously sweep between 36 to 48, 42 to 54, 30 to 42, or any other 12 kc. range anywhere in this band, depending on the setting of the scanning oscillator. The dial of the scanning oscillator may be calibrated directly in yards (range) at a particular sawtooth frequency or can be calibrated in terms of the factor $df/\Delta f$, by which the indicated range shown on the range dial of the master oscillator will be multiplied to obtain the true range. The remaining portions of the circuit shown in FIG. 11 are the same as those in FIG. 1.

Additionally, it is easily possible to periodically vary (in a sawtooth, sinusoidal, etc. manner) the displacement $df$. This may be done either mechanically or electronically through any predetermined range and at any desired rate. Then by suitably coupling this circuit to the vertical (Y-axis) of a cathode-ray oscillograph in which the output of the receiver modulates the Z-axis, a range scan indication is made available. A deflection voltage, proportional to the bearing of the wave radiator's beam axis angle, is supplied to the horizontal (X-axis) plates of the oscillograph, by any convenient means, as indicated by the dotted lines in FIG. 11. If the angle of the wave radiator's beam axis is varied mechanically, a simple rheostat rotated in synchronism with the wave radiator will provide such a deflection voltage. If an acoustic grating, of a type to be described, is used to vary the beam axis angle as a linear function of time, such a voltage can be obtained from the sawtooth generator which has been described as a part of the master oscillator.

It will be noticed that the displaced injection method just described is a form of frequency analyzer. It is possible, instead of scanning with many frequencies and using a single filter, to use a single injection frequency and pass the output of the first detector into many filters. The outputs of these filters can then be electronically scanned by a form of electronic switch. Each filter in such a system corresponds to a particular range and the inherent ambiguity of indication is avoided by using a very slow sawtooth and using echoes whose echo time is never more than one-quarter of the sawtooth period. For presentation, the switch scan may be coupled to the vertical plates of an oscillograph, and the filter outputs to the Z axis of the azimuthal scan of a cathode-ray oscillograph.

Figure 12:
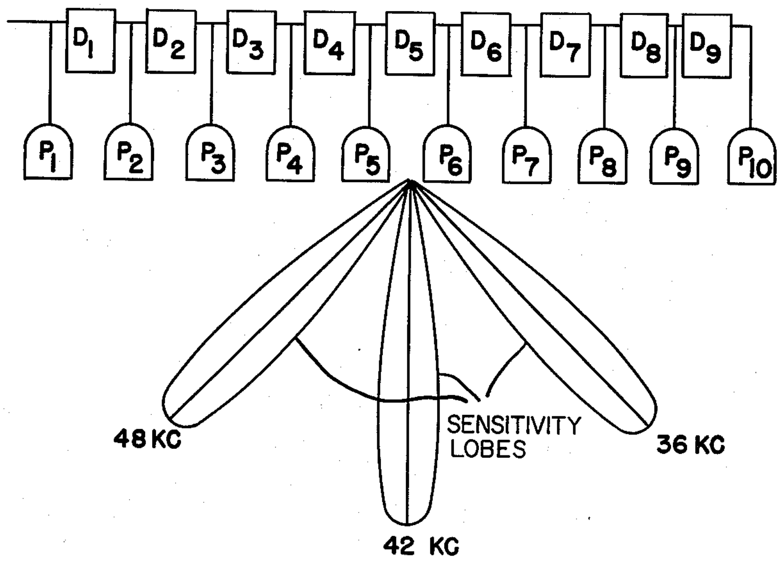
FIG. 12 is a schematic diagram illustrating the use of an alternative type wave receiver.

The other type system for providing automatic annular scanning is one which scans over a wide angle at a given range. This can be accomplished by using as a receiver an "acoustic grating" which is essentially a directive transducer in which the sharpness of beam is substantially independent of frequency, but in which the direction of the axis of the beam is a function of frequency. This kind of transducer behaves like an optical diffraction grating of few lines. It is well known in the art that a linear array of wave sensitive elements electrically connected in parallel is directive, and that, if the elements vibrate in phase, the axis of the major directive lobe of such an array is normal to the line of elements and is independent of frequency. The receiver which has been found useful in connection with this system differs from such an ordinary array in that means for providing an electrical delay between the sensitive elements have been added, as shown in FIG. 12 in which $D_1$, $D_2$, $D_3$ . . . etc. and $P_1$, $P_2$, $P_3$ . . . etc., represent delay networks and projectors, respectively. This delay varies with frequency because the network which provides the delay is designed to have delay distortion.

In many wave filter networks, the delay varies smoothly and continuously over the pass band. When such a network is connected between each element of such an array of wave sensitive elements its effect is to cause the axis of the major directive lobe to change its direction as shown in FIG. 12, and this change can be used to scan a sector.

In combination, now, with a range selective device, such as originally described, the device as a whole scans an annulus. One such network is the confluent band-pass filter and it is particularly desirable for this purpose because it provides approximately twice the delay distortion per section that the more common types of band-pass filters can provide. Since such a grating can be built to scan a sector extending over 120°, it provides an excellent receiver for the present echo-ranging system because automatic angular scanning is provided.

When the grating is used in connection with the present system to search an annulus, the presence of a target object within the scanned section of the "focused" annulus is indicated by a periodic signal in the output circuit of the receiver. This signal is of essentially constant pitch and its duration is a function of the sawtooth rate, beam width of the grating receiver, total angle of scan of the grating receiver, and angular intercept of the target object projection.

In the echo-ranging system of the type originally described herein, echo frequency is a function of range as well as of time. Anything causing a systematic shift in echo frequency will therefore cause an error in range indication. Relative velocity between the reflecting object and the point of observation will cause a systematic shift in frequency of the waves reflected from such an object by reason of the well-known Doppler effect. The magnitude of the error in percent per knot of relative velocity is a function of the ratio of two design parameters: namely, the average carrier frequency ($f_{av}$) of the high-frequency transmission and the amplitude of the frequency modulation deviation ($\Delta f$). The sign of the error is dependent upon two factors; (*a*) whether the modulation sawtooth slope (neglecting the "flyback" or retrace slope), sweeps the high-frequency carrier wave upward or downward in frequency with time; and (*b*) whether the range is opening or closing.

The relative velocity between the observation point and the reflecting object is termed "range rates." When the range is opening or increasing the range rate is considered as positive, and when closing, negative in sign. The Doppler error in the range indication is considered to have a *positive* sign if the system *overestimates* the true range. An *underestimate* of the true range means the sign of the range error is *negative*.

The relationship between the signs of the range rate, sawtooth slope and range indication error follows a simple sign rule like the multiplication of algebraic terms. (Like signs give plus; unlike signs give minus.) Therefore when the signs of the range rate and the sawtooth slope are alike the range indication error sign is (+) which means the true range is being overestimated. Unlike signs for the range rate and sawtooth slope make the sign of the range indication error (−) corresponding to an underestimate of the true range. More simply, positive slopes "focus" on a point ahead of the target, negative one behind it.

The magnitude of the range error (E) introduced by the system by the Doppler effect (in percent per knot of range rate) is seen to be $$E=\frac{2\times 1.69\times f_{av}}{V\Delta f}\times 100$$

1.69=range rate of 1 knot (in ft./sec.)
$f_{av}$=average frequency ( in cycles)
$\Delta f$=maximum difference frequency (in cycles)
V=velocity of wave propagation (in ft./sec.)

This Doppler range error indicated by the present echo-ranging system is proportional to the range rate, and has an extremely useful application to fire-control problems. If the echo-ranging system is associated with a gun or similar piece of ordnance whose projectile has a finite time of flight, it is necessary to anticipate by an interval equal to the time of projectile flight, the instant at which the attacking vessel and the target will be separated by the static range of the projectile. If the projectile is to strike the target, and if the range rate between them is not zero, the projectile must then be fired when the true range differs from the base projectile range by an amount proportional to the range rate. In flight, the projectile has imparted to it the line-of-fire velocity of the attacking vessel. In addition the target object moves with its line-of-fire velocity during the projectile time of flight. Both of these motions tend to make the projectile miss the target. They act to lengthen the effective range of the projectile when the attacking vessel and target are approaching.

This error in ordnance range ($E_0$) is readily seen to be equal to (in percent of range, per knot of range rate)

$$E_0=\frac{1.69\times t}{R}\times 100$$

where $t$=time of flight of projectile (in seconds)
$R$=base range of projectile (in feet)

In order that these two errors, (1) caused by the Doppler effect as seen by the system, and (2) caused by the projectile flight, may compensate for one another, they must be equal. Equating $$E=E_0$$

$$2\times\frac{1.69\times f_{av}}{V\Delta f}\times 100=\frac{1.69\times t}{R}\times 100$$

from whence $$\frac{f_{av}}{\Delta f}=\frac{tV}{2R}$$

which is the ratio of the echo-ranging parameters necessary to provide complete range rate compensation. Although this is the most useful form of the equation, it may be further simplified by noting that $$\frac{t}{R}=\frac{1}{v}$$

where $v$ is equal to the average horizontal velocity of the projectile (in ft./sec.). Substituting in the first equation, it is seen that $$\frac{f_{av}}{\Delta f}=\frac{V}{2v}$$

which indicates that the parameters of the system must be chosen so that their ratio is equal to one-half the ratios of the velocity of the wave in the medium and the average horizontal velocity of the projectile.

Thus, it is seen that by choosing the proper parameters ($f_{av}$ and $\Delta f$) and the proper sign (positive) of the sawtooth slope used in the system, the ordnance error may be compensated for very accurately by the Doppler error in the range indication. For example, if a particular fixed-elevation gun fires a projectile whose base range is 900 feet and whose flight time is 7.5 seconds (and the velocity of sound in water is taken to be 4800 ft./sec.), the received equation gives the following $$\frac{f_{av}}{\Delta f}=\frac{tV}{2R}=\frac{7.5\times 4800}{2\times 900}=20.0$$

wherein $f_{av}$ might be 40 kc. and $\Delta f$ might be 2 kc.

Figure 13:
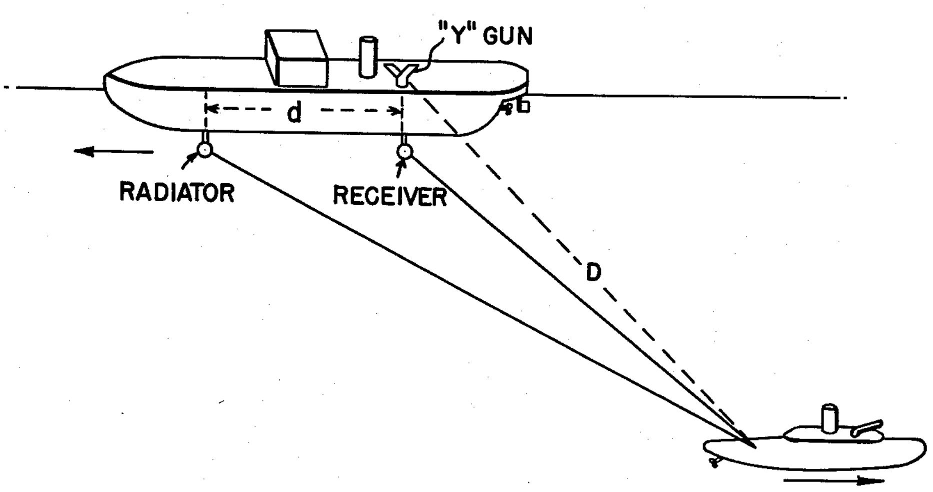
FIG. 13 is a schematic diagram illustrating relative locations of receiver, radiator and Y guns for Doppler correction.

It has been found that by using such properly related frequencies very accurate compensation for the Doppler effect is accomplished. By this method, the projectile can be fired when the indicated range equals the base range of the projectile, regardless of the sign or magnitude of the range rate. Such calculations involve but one assumption, usually acceptable, namely, that the target object moves in a straight line at constant speed during the flight time of the projectile. This arrangement is diagrammatically illustrated in FIG. 13, wherein distance $d$ represents the distance from receiver to radiator and distance D, the actual range.

The invention described herein may be manufactured and used by or for the Government of the United States of America for governmental purposes without the payment of any royalties thereon or therefor.

Having described the invention, I claim:

1. In a fire-control mechanism which includes ordnance means for propelling a projectile to an object in a predetermined time; a low-frequency oscillator having means for generating a substantially adjustable linear sawtooth wave; a high-frequency oscillator frequency modulated between adjustable frequency limits by said sawtooth wave; a wave radiator driven by said high-frequency oscillator; a receiver tuned to exclude waves of frequency beyond said limits and mounted to receive waves emitted by said radiator after reflection from said object; said radiator, said receiver and the ordnance means being mounted in predetermined relation; means for indicating the presence of said waves between said frequency limits after reflection from said object; the ratio of the average frequency of said high-frequency oscillator to the maximum deviation of the frequency produced by the modulation of said oscillator being equal to one-half the ratio of the velocity of the wave in the medium over the average horizontal velocity of the projectile.

2. In a fire-control mechanism which includes ordnance means for propelling a projectile to an object in a predetermined time; a low-frequency oscillator having means for generating a substantially linear sawtooth wave; means for adjusting the frequency of said low-frequency oscillator; a high-frequency oscillator frequency modulated between frequency limits by said sawtooth wave; means for adjusting the frequency of said high-frequency oscillator; a wave radiator driven by said high-frequency oscillator; a receiver tuned to exclude waves of frequency beyond said limits and mounted to receive waves emitted by said radiator after reflection from said object; said radiator, said receiver and the ordnance means being mounted in predetermined relation; means for indicating the presence of said waves between said frequency limits after reflection from said object; the ratio of the average frequency of said high-frequency oscillator to the maximum deviation in frequency produced by the modulation of said oscillator being equal to one-half the ratio of the velocity of the wave in the medium over the average horizontal velocity of the projectile.

3. In combination with a fire-control mechanism which includes ordnance means for propelling a projectile to an object in a predetermined time; a low-frequency oscillator having means for generating a substantially linear, adjustable sawtooth wave; a high-frequency oscillator frequency modulated between adjustable frequency limits by said sawtooth wave; a wave radiator driven by said high-frequency oscillator; a receiver tuned to exclude waves of frequency beyond said limits and mounted to receive waves emitted by said radiator after reflection from said object; said radiator, said receiver and the ordnance means being mounted in predetermined relation; means for indicating the presence of said waves between said frequency limits after reflection from said object; the ratio of the average frequency of said high-frequency oscillator to the maximum deviation in frequency produced by the modulation by said sawtooth wave being the same as the ratio of the time of flight of the projectile times the velocity of wave propagation is to twice the range rate whereby the error produced by the relative motion between said object and said radiator, receiver, and ordnance means is eliminated.

References Cited in the file of this patent

UNITED STATES PATENTS

| | | |
|---|---|---|
| 2,045,071 | Espenschied | June 23, 1936 |
| 2,082,317 | Barber | June 1, 1937 |
| 2,169,304 | Tournier | Aug. 15, 1939 |
| 2,248,599 | Alexanderson | July 8, 1941 |
| 2,256,539 | Alford | Sept. 23, 1941 |
| 2,268,587 | Guanella | Jan. 6, 1942 |
| 2,405,134 | Brown et al. | Aug. 6, 1946 |
| 2,553,907 | Fleming-Williams et al. | May 22, 1951 |